United States Patent
Ahluwalia et al.

(10) Patent No.: US 7,475,216 B2
(45) Date of Patent: *Jan. 6, 2009

(54) MEMORY TRACKING WITH PRESERVATION OF ALIGNMENT SEMANTICS

(75) Inventors: Vikas Ahluwalia, Kirkland, WA (US); Scott A. Piper, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/780,169

(22) Filed: Jul. 19, 2007

(65) Prior Publication Data

US 2008/0022066 A1   Jan. 24, 2008

Related U.S. Application Data

(63) Continuation of application No. 10/867,929, filed on Jun. 15, 2004, now Pat. No. 7,249,238.

(51) Int. Cl.
*G06F 12/00* (2006.01)
(52) U.S. Cl. .................................... 711/170
(58) Field of Classification Search ........... None
See application file for complete search history.

(56) References Cited

U.S. PATENT DOCUMENTS

| | | | |
|---|---|---|---|
| 5,600,823 A | | 2/1997 | Sherer et al. |
| 5,675,790 A | * | 10/1997 | Walls ........................ 707/205 |
| 5,729,710 A | | 3/1998 | Magee et al. |
| 5,978,893 A | * | 11/1999 | Bakshi et al. ............... 711/171 |
| 6,070,202 A | * | 5/2000 | Minkoff et al. ............... 710/56 |
| 6,088,777 A | * | 7/2000 | Sorber ........................ 711/171 |
| 6,507,901 B1 | * | 1/2003 | Gopalakrishnan et al. ... 711/170 |
| 2002/0059507 A1 | * | 5/2002 | Hironaka .................... 711/170 |
| 2002/0161932 A1 | | 10/2002 | Herger et al. |

* cited by examiner

*Primary Examiner*—Jack A Lane
(74) *Attorney, Agent, or Firm*—Lieberman & Brandsdorfer, LLC

(57) ABSTRACT

A method and system for tracking usage of memory in a computer system is provided. Arguments for both the size of a memory allocation and the type of memory being allocated are reserved in a fixed location. A first fixed location is reserved for small memory allocations, i.e. less than one page, and a second fixed location is reserved for large memory allocations, i.e. one page or larger. The fixed location is selected based upon a determination of the size of an allocation required by a calling application. Upon receipt of a memory allocation request by the calling application, a pointer is returned to the calling application identifying the fixed location. Similarly, upon release of memory by the calling application, a counter is decremented to track the amount of memory in use by the application.

19 Claims, 6 Drawing Sheets

MEMORY TRACKING WITH PRESERVATION OF ALIGNMENT SEMANTICS

CROSS REFERENCE TO RELATED APPLICATION(S)

This application is a continuation of application Ser. No. 10/867,929, filed Jun. 15, 2004, now U.S. Pat. No. 7,249,238 which is hereby incorporated herein by reference.

BACKGROUND OF THE INVENTION

1. Technical Field

This invention relates to a method and system for managing memory allocations. More specifically, the invention relates to counting the memory used by an application.

2. Description of the Prior Art

Kernel mode memory is memory that is reserved for operating system applications. There are two classifications of kernel mode memory, paged and non-paged. Both the paged and non-paged kernel mode memory are forms of volatile memory. However, paged memory can be stored temporarily on storage media. The quantity of kernel mode memory in an operating system is statically configured. In order to maintain stability of operating system applications, there needs to be enough kernel mode memory available for each application that utilizes the kernel mode memory. If there is an insufficient amount of kernel mode memory for an operating system application, the operating system will become unstable. Accordingly, limiting the amount of kernel mode memory used by a particular operating system application is critical so that enough kernel mode memory is available for other applications.

Consecutive bytes of memory, kernel mode and non-kernel mode, in a computer system are divided into pages, with each page representing a defined portion of storage space. In one embodiment, each page of memory is 4096 bytes in length. For example, $page_0$ would include bytes 0 through 4095, $page_1$ would include bytes 4096 through 8191, etc. Microsoft Windows operating systems guarantee the following memory allocation format: a memory allocation of less than a page is eight byte aligned, an allocation of one or more pages is page aligned, and an allocation of a page or less does not cross a page boundary.

Prior art computer systems that maintain a count of kernel mode memory used by an application attach a header having a length of eight bytes to each allocation. The header is structured to include a tag to indicate whether the allocation is for paged memory or non-paged memory. In addition, the header stores the size of the kernel mode memory allocated. FIG. 1 is a flow chart (10) demonstrating a prior art tool for allocating kernel mode memory to a calling application. For each calling application, the size and type of the memory allocation request is obtained (12). A memory allocation is provided from the operating system (14). The size of the memory allocation includes the size provided from the calling application and the size of the header. Following the memory allocation at step (14), a test is conducted to determine if the memory allocation was successful (16). The test consists of checking the value of a pointer returned by the operating system. A negative response to the test at step (16) will result in setting a pointer to the memory allocation to NULL (18), and returning the pointer to the calling application (20). However, a positive response to the test at step (16) will result in setting a pointer to identify the first byte of the allocated memory (22). A tag is an identifying entry in the header pertaining to the type of memory, i.e. paged or non-paged. The tag is stored at the beginning of the header (24), and the size of the allocated memory is stored at another location in the header (26). In one embodiment where the header is eight bytes, the tag information begins at the first byte of the header and the size of the allocated memory begins at the fifth byte of the header. A counter corresponding to the page type, i.e. a paged memory counter or a non-paged memory counter, is incremented to reflect usage of kernel mode memory (28). A pointer is returned to the calling application of the first byte of useful memory (30), i.e. the first byte following the header. Accordingly, the prior art memory allocation process attaches a header to each memory allocation to store the allocation size and type.

Kernel mode memory is allocated based upon availability. When an application does not require use of the kernel mode memory, the memory is released by the application so it may be made available to other applications. FIG. 2 is a flow chart (50) illustrating a prior art process of an application releasing kernel mode memory. A pointer to the first byte of useful memory is obtained from the application in response to a function call made by the application (52). Thereafter, the size of the memory allocation placed in the header at step (26) and the tag information placed in the header at step (24) is extracted from the header (54). A test is conducted to determine if the memory allocation referenced in the tag is for paged memory (56). A negative response to the test at step (56) identifies the memory allocation being release as non-paged memory. A counter for non-paged memory is then decremented by the size of the memory allocation being released by the calling application (58). Conversely, a positive response to the test at step (56) is an indication that the kernel mode memory is paged memory. A counter for paged memory is then decremented by the size of the memory allocation being released by the calling application (60). Following step (58) or step (60), the memory, including the header portion, is released from the calling application (62) and available for assignment in subsequent memory allocation requests.

The process of an application releasing a memory allocation provides data pertaining to usage of kernel mode memory by the application based upon the size of the allocation stored in the associated header. However, there are limitations associated with this prior art approach to tracking use of kernel mode memory. The prior art solution shown in FIGS. 1 and 2 does not have the capability to preserve Windows semantics for alignment of the allocated memory. For example, allocation of a page of memory would require the actual amount of memory allocated to include the header. In effect, the amount of memory allocated may be slightly larger than a page, i.e. by the size of the header. This would cause the memory returned to the calling application to cross a page boundary.

Therefore, there is a need for a solution that tracks the size of the memory allocation while preserving Windows alignment semantics. In addition, such a solution should be efficient and not negatively impact upon system performance.

SUMMARY OF THE INVENTION

This invention comprises a method and system for tracking memory in a computer system.

In one aspect of the invention, an article is provided with a computer-readable carrier including computer program instructions configured to track memory. Instructions are provided to maintain size and type information of memory allocation in a fixed location. Furthermore, instructions are provided to select a first fixed location for a small memory allocation and a second fixed location for a large memory allocation. Following the selection, instructions are provided to identify the fixed location to a calling application.

In another aspect of the invention, an article is provided with a tangible computer-readable carrier including computer program instructions configured to track memory, comprising. Instructions are provided to maintain size and type information of memory allocation in a fixed location. Furthermore, instructions are provided to select a first fixed location for a small memory allocation and a second fixed location for a large memory allocation. Following the selection, instructions are provided to identify the fixed location to a calling application.

In a further aspect of the invention, an article is provided in a computer-readable signal-bearing medium. Means in the medium are provided for maintaining size and type information of a memory allocation in a fixed location. Means in the medium are also provided for selecting one location for a small memory allocation and a second location for a large memory allocation. Finally, means in the medium are provided for identifying one of the locations to a calling application.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Memory is allocated to a calling application while preserving Windows alignment semantics. Small memory allocations are no larger than a single page of memory, while large memory allocations are memory allocations exceeding a single page of memory. A small memory allocation is provided with a header to store the size of the memory allocation. However, the allocation size of a large memory allocation is stored in a hash table that contains an associated entry for the allocation size of each large memory allocation. Large memory allocations are also page aligned. Additionally, both small and large memory allocations include a fixed location associated with the allocation to maintain size and type information. A pointer to the fixed location is used to identify both the location of the memory allocation and the associated size.

Technical Details

Memory is divided into pages, with each page of memory storing a set quantity of bytes of data. Allocations of memory are categorized by a size argument. A small memory allocation is defined as memory that requires no more than one page less a header. Similarly, a large memory allocation is defined as memory that requires more than one page. A small memory allocation includes a header to store information regarding the location and size of the memory allocated. The header occupies a predefined length of the memory request and is prepended to the request. For example, a memory allocation of less than one page will have an additional quantity of bytes of memory added to the original size of the memory request which is reserved to store header data. In one embodiment, the header may occupy eight bytes of memory, with the first four bytes used to store memory type information and the second four bytes used to store the size of the allocated memory. A large memory allocation does not have a header since such a provision may cause page alignment problems for the allocation. As such, information regarding the location and size of a large memory allocation is stored as an entry in a hash table located in volatile memory. In one embodiment, the hash table entry includes pieces of data comprising a pointer to the first byte of the allocated memory and the size of the allocated memory.

Figure 1:
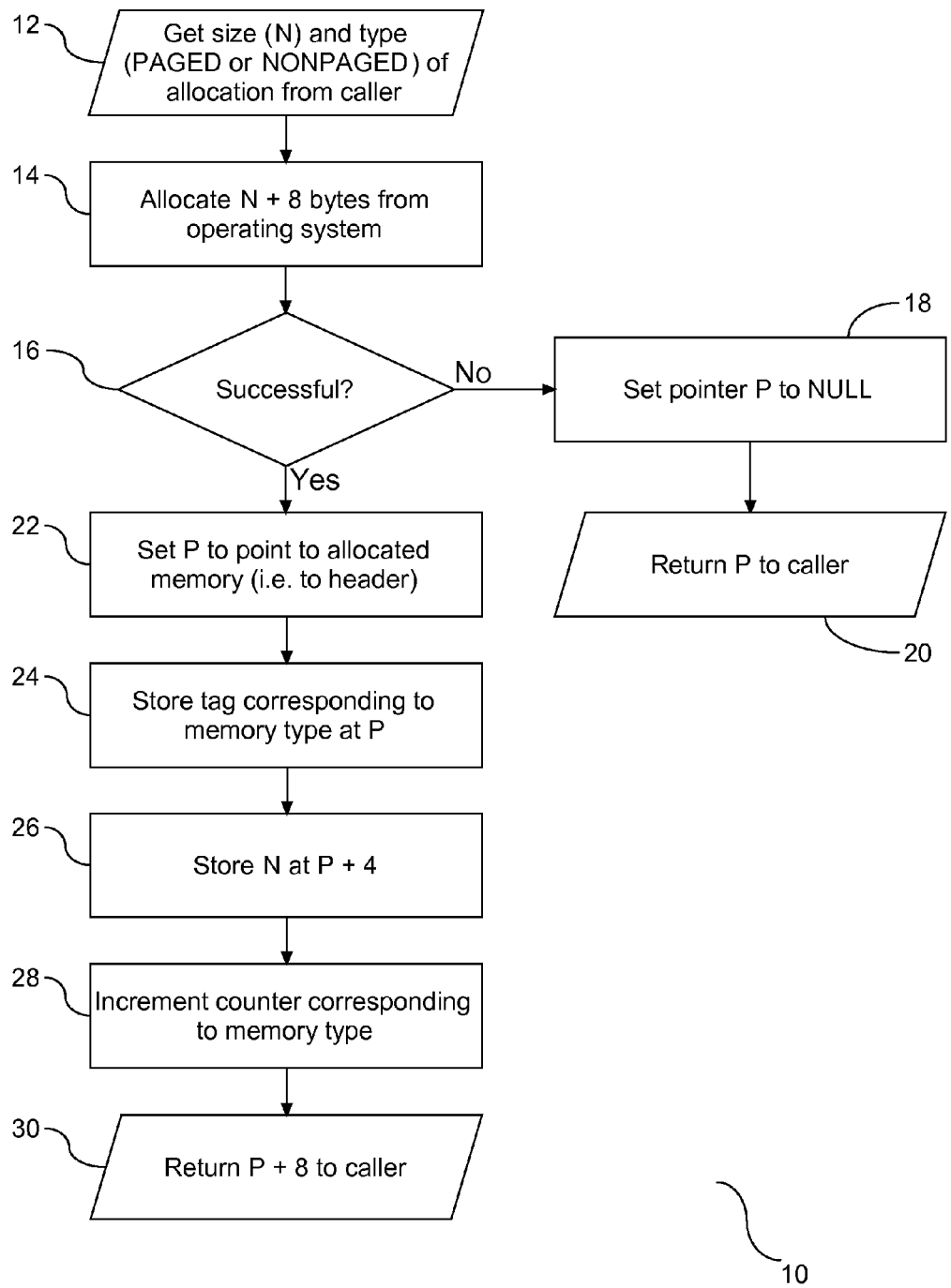
FIG. 1 is a flow chart illustrating a prior art process of allocating memory with use of a header.
Figure 2:
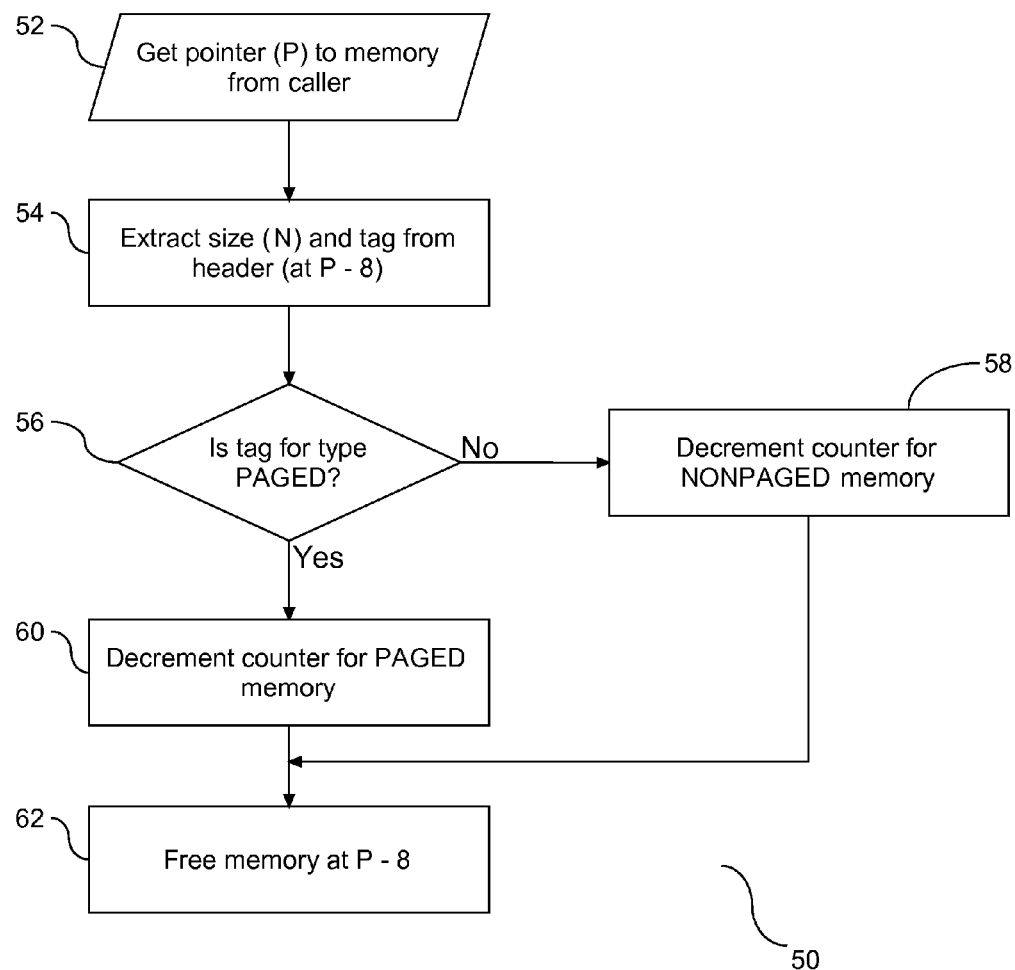
FIG. 2 is a flow chart illustrating a prior art process of releasing a memory allocation from an application.
Figure 3:
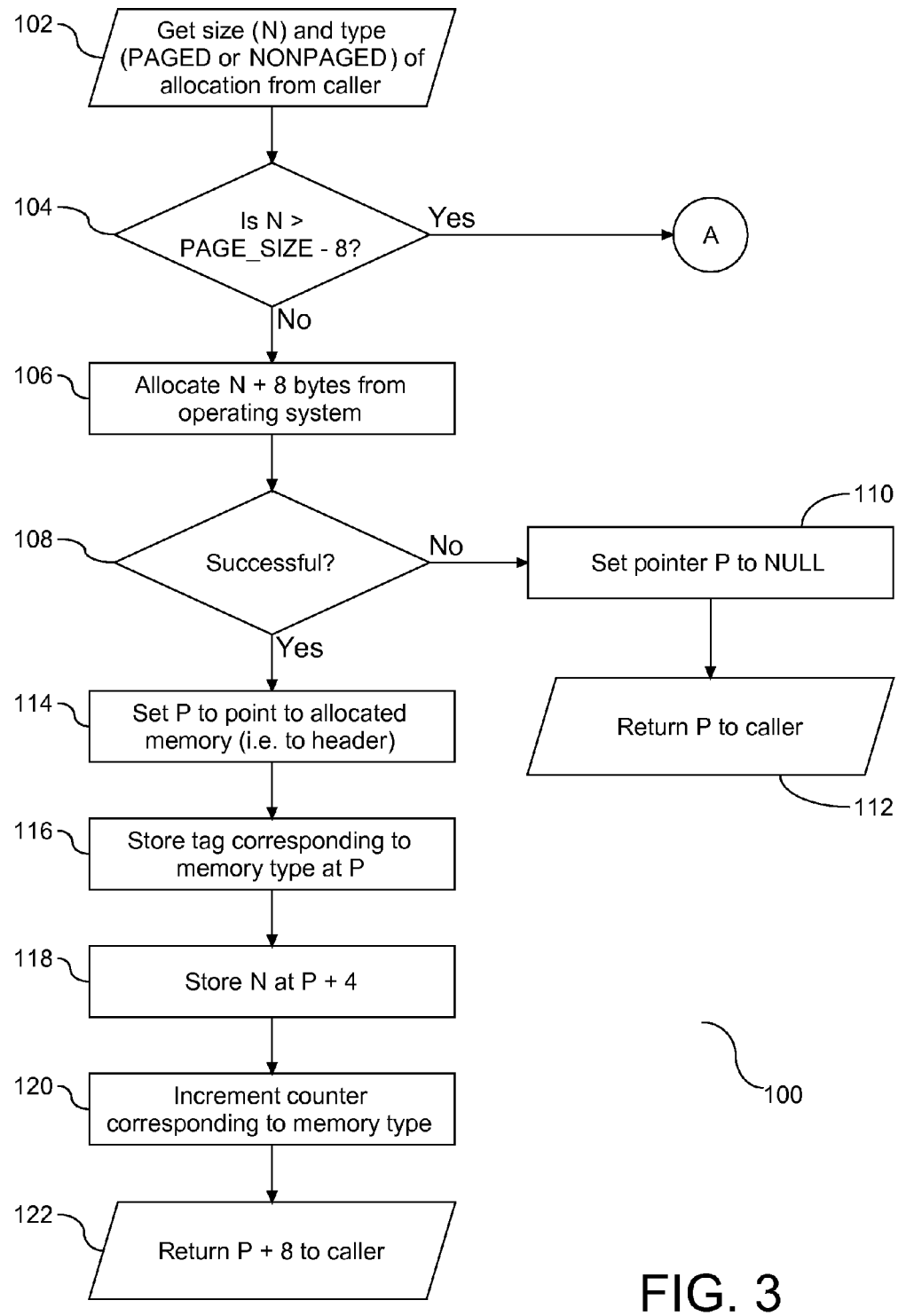
FIG. 3 is a flow chart illustrating a process of a small memory allocation according to the preferred embodiment of this invention, and is suggested for printing on the first page of the issued patent.

FIG. 3 is a flow chart (100) illustrating a process for allocation of kernel mode memory to a calling application that requires less than one page of memory while satisfying Windows page alignment semantics. For each calling application, the size and type of the memory allocation request is obtained (102). Thereafter, a test is conducted to determine if the memory allocation request is for a small memory allocation or a large memory allocation (104). In one embodiment, Window semantics requires that memory allocations less than one page be eight byte aligned. In an eight byte aligned environment, the test at step (104) may determine if the memory allocation request including an eight byte header will amount to more than one page of memory. A negative response to the test at step (104) will result in a memory allocation being provided to the calling application from the operating system (106). The size of the memory allocation will include the memory size requested by the calling application with the addition of memory for the associated header. Following the memory allocation at step (106), a test is conducted to determine if the memory allocation was successful (108) The test consists of checking the value of a pointer returned by the operating system. A NULL pointer returned from the test is an indication of failure of the memory allocation, and a return of any other pointer value is an indication of a successful memory allocation. A negative response to the test at step (108) will result in setting a pointer to the memory allocation to NULL (110), and returning the pointer to the calling application (112). However, a positive response to the test at step (108) will result in setting a pointer to identify the first byte of the allocated memory (114). A tag is an identifying entry in the header pertaining to the type of memory, i.e. paged or non-paged. In one embodiment, the tag is stored in the beginning of the header (116), and the size of the allocated memory is stored at another location in the header (118). For example, where the header is eight bytes, the tag information begins at the first byte of the header and the size of the allocated memory begins at the fifth byte of the header. A counter corresponding to page type, i.e. a paged memory counter or a non-paged memory counter, is incremented to reflect usage of kernel mode memory (120). A pointer is returned to the calling application of the first byte of useful memory (122), i.e. the first byte following the header. Accordingly, a header in compliance with Windows alignment semantics is attached to each small memory allocation and is used to store the allocation size and type.

Figure 4:
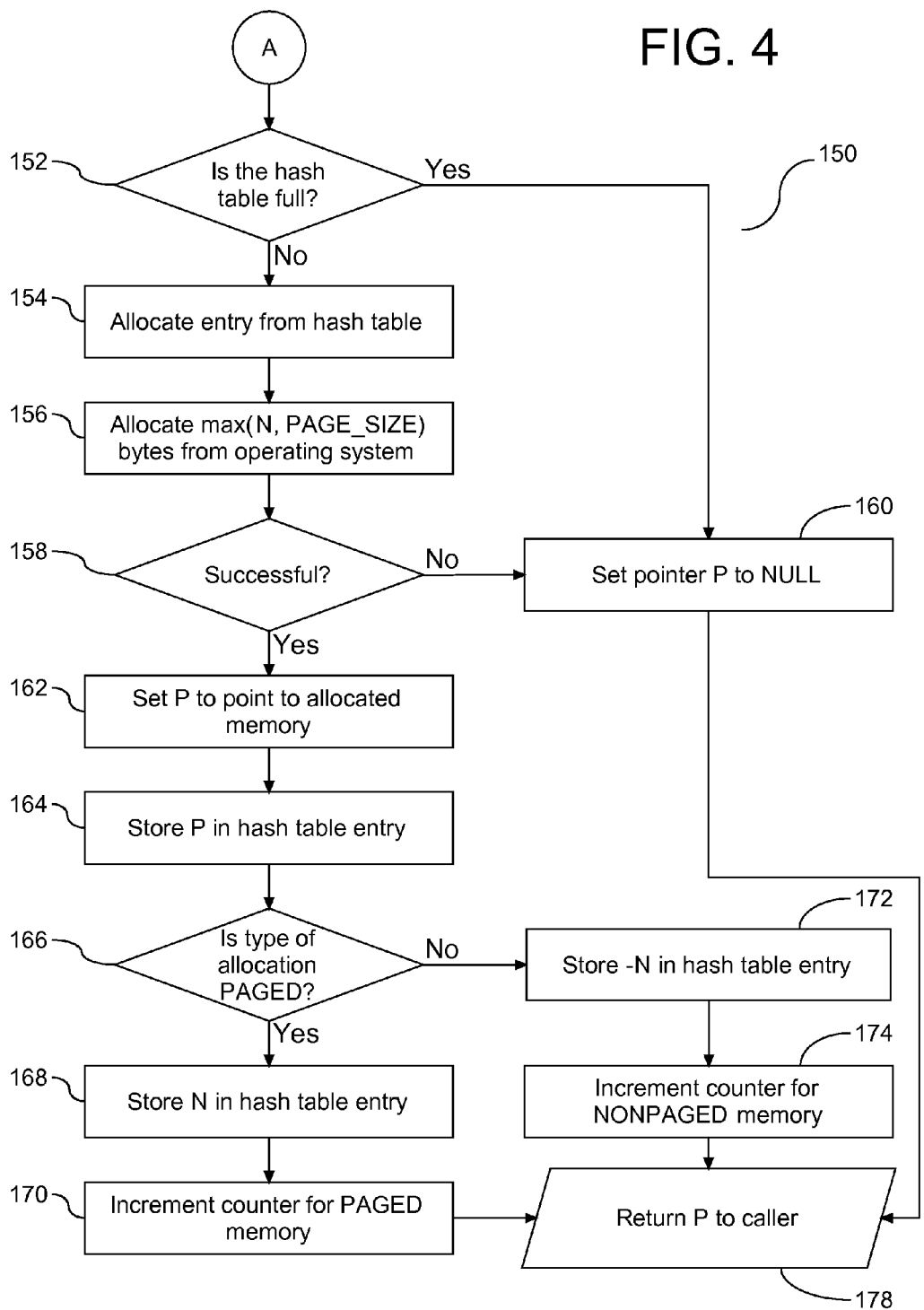
FIG. 4 is a flow chart illustrating a process of a large memory allocation.

FIG. 4 is a flow chart (150) illustrating a process for allocation of kernel mode memory to a calling application that requires more than one page of memory, while satisfying Windows page alignment semantics. In one embodiment, a positive response to the test at step (104) of FIG. 3 indicates that a large memory allocation is being requested. The positive response to the test at step (104) will result in a subsequent test to determine if an associated hash table in volatile memory is full (152). Memory for the hash table is allocated statically, i.e. in a fixed size. A positive response to the test at step (152) is an indication that the hash table cannot accommodate additional entries. This will result in a setting a pointer to the memory allocation to NULL (160), and returning the pointer to the calling application (178). However, a negative response to the test at step (152), will result in the allotment of an entry in the hash table for the associated memory allocation (154). Thereafter, kernel mode memory is allocated to the calling application based upon the size of memory requested, with at least a whole page of memory allocated to accommodate the amount of memory requested (156). For example, since the system allocates memory in whole page increments, if the calling application requested more than one but less than two pages of memory, the system would allocate two whole pages of memory as the memory block for the calling application. Following the allocation, a test is conducted to determine if the memory allocation was successful (158). A negative response to the test at step (158) will result in setting a pointer for the memory allocation to NULL (160), and returning the pointer to the calling application (178). However, a positive response to the test at step (158) will result in setting the pointer to point to the first byte of the allocated memory (162). The pointer is then stored in the associated hash table entry (164). Accordingly, a large memory allocation request stores the associated memory allocation information in a hash table stored in volatile memory while a small memory allocation request stores the associated memory allocation information in the header of the allocated memory.

In one embodiment, paged memory is stored as a positive value, and non-paged memory is stored as a negative value. Following step (164), a test is conducted to determine if the memory allocation is paged memory or non-paged memory (166). A positive response to the test at step (166), will result in storing the size of the memory allocation in the hash table entry as a positive value (168) followed by incrementing the paged memory counter (170). Alternatively, a negative response to the test at step (166), will result in storing the size of the memory allocation in the hash table entry as a negative value (172) followed by incrementing the non-paged memory counter (174). The pointer is then returned to the calling application with the location of the first byte of the memory requested (178). Accordingly, FIGS. 3 and 4 demonstrate how small and large allocations of kernel mode memory may be granted to a calling application while respecting Windows alignment semantics.

Figure 5A:
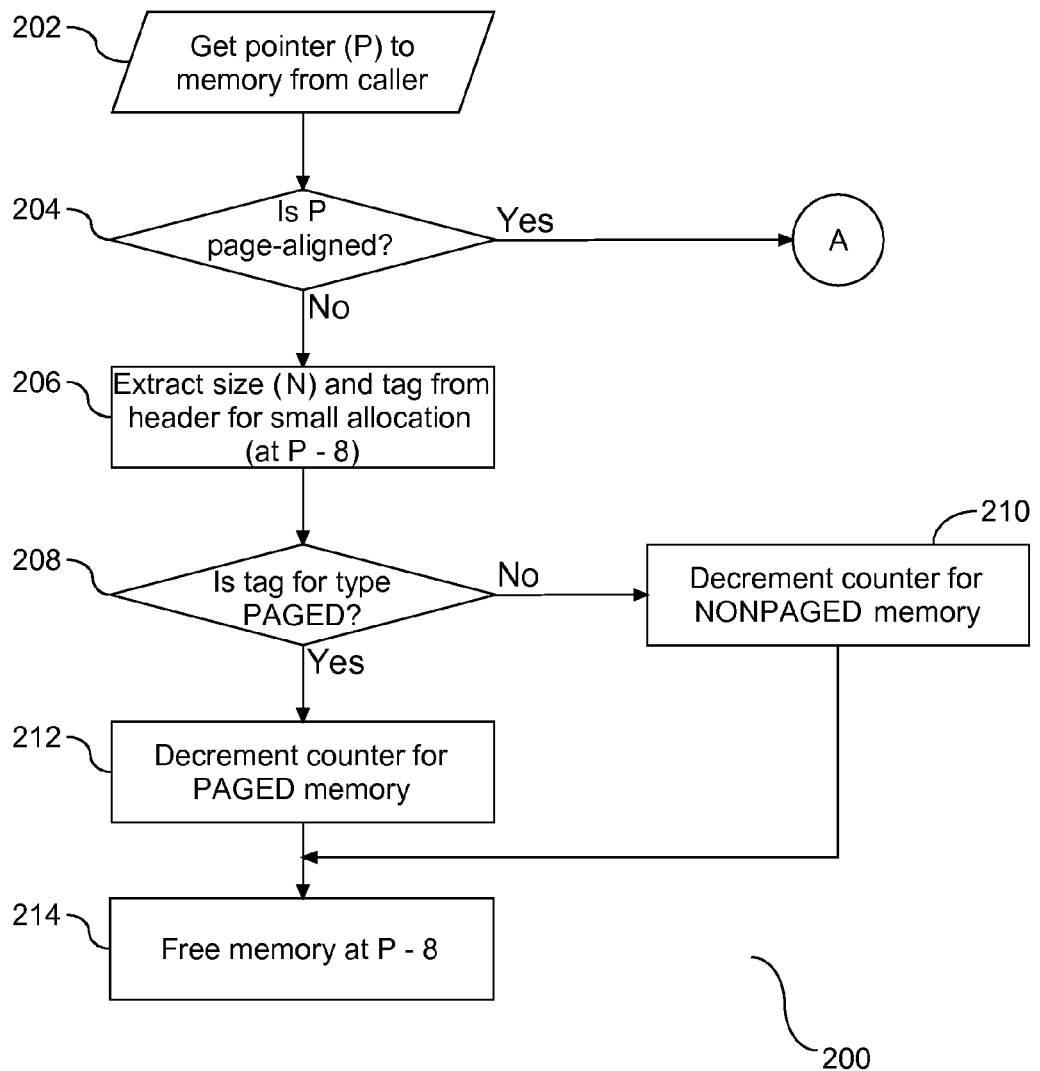
FIGS. 5A and 5B are a flow chart illustrating a process of releasing a memory allocation from an application.
Figure 5B:
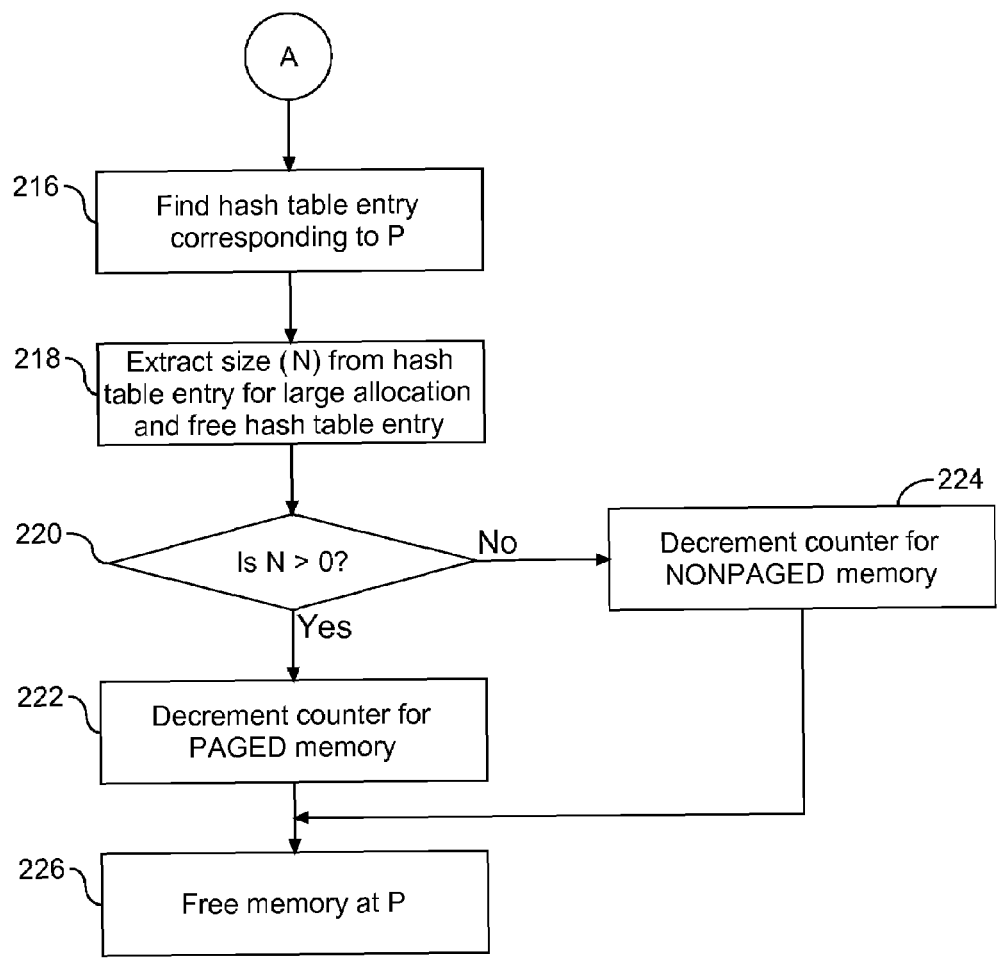

In addition to allocating kernel mode memory to calling applications, the kernel mode memory may be released by an application that no longer requires the memory allocation. FIGS. 5A and 5B are a flow chart (200) illustrating a process for releasing previously allocated memory. A pointer to the allocated memory is obtained from the calling application (202). Thereafter, a test is conducted to determine if the pointer pertains to a small memory allocation (204). In one embodiment where a small memory allocation of one page or less is utilized, the test at step (204) will inquire if the memory previously allocated to the calling application is page aligned. A negative response to the test at step (204) is an indication that the pointer is from a small memory allocation and therefore the size and tag information of the memory allocation is stored in the memory allocation header. The size of the memory allocation and the tag information is then extracted from the header (206). Thereafter, a test is conducted to determine if the memory being released from the calling application is paged memory or non-paged memory (208). A negative response to the test at step (208) identifies the memory allocation being released as non-paged memory. A counter for non-paged memory is then decremented by the size of the memory allocation being released by the calling application (210). However, a positive response to the test at step (208) identifies the memory allocation being released as paged memory. A counter for paged memory is then decremented by the size of the memory allocation being released by the calling application (212). Following step (210) or step (212), the memory, including the header portion, is released from the calling application (214) and available for assignment in subsequent memory allocation requests. Accordingly, the process of releasing a prior memory allocation of one page or less includes a release of the header portion along with the memory allocation assigned to the calling application.

A positive response to the test at step (204) is an indication that the pointer is for a large memory allocation as a large memory allocation encompasses more than one page of memory and requires page alignment. As such, the size and tag information of the memory allocation is stored as an entry in a hash table. The hash table entry corresponding to the pointer is found (216), using a hash table look-up based on the pointer obtained from the application at step (202). Thereafter, the size and tag information of the memory allocation is extracted from the hash table and the entry in the hash table is removed (218). A test is then conducted to determine if the type of the memory allocation extracted from the hash table is paged or non-paged memory (220). A positive response to the test at step (220) will result in a determination that the memory is paged memory, and a counter for paged memory is decremented by the size of the memory allocation being released by the calling application (222). Similarly, a negative response to the test at step (220) will result in a determination that the memory is non-paged memory, and a counter for non-paged memory is decremented by the size of the memory allocation being released by the calling application (224). Following step (222) or step (224), the memory allocation is released from the calling application (226). Accordingly, the process of releasing a prior memory allocation of more than one page includes obtaining memory size and type information from a related hash table entry.

Advantages Over the Prior Art

Both the header for memory allocations of one page or less, and the hash table entry for memory allocations exceeding one page respect Windows alignment semantics while tracking availability of memory for other applications. Each of the separate counters for paged and non-paged memory maintain an accurate count of memory used by a calling application. The size and type of a memory allocation to a calling application are provided as two separate arguments to the respective header or hash table entry. Upon releasing a memory allocation from a calling application, both of the arguments, i.e. type and size, are directly communicated to an associated counter. In addition, two separate counters are provided, one counter for paged memory and one counter for non-paged memory. The appropriate counter is decremented prior to releasing the memory from the calling application. Accordingly, an associated device driver will have knowledge of the amount of each type of memory in use prior to releasing the memory from the calling application.

Alternative Embodiments

It will be appreciated that, although specific embodiments of the invention have been described herein for purposes of illustration, various modifications may be made without departing from the spirit and scope of the invention. In particular, the header portion for a memory allocation of less than one page may be any size that can accommodate storing both the memory allocation size and type therein, while preserving Windows alignment semantics or the associated alignment semantics of the operating system being utilized by the computer system. In addition, a large memory allocation associates a negative identifiers with a non-paged memory allocation. An alternative identifier, such as a tag in the case of a small memory allocation, may be used to identify the type of memory associated with the allocation. Additionally, the hash table may be replaced by an alternative indexing element, such as a one dimensional array or a linked list, that supports a sufficient quantity of space to store a pointer and page identifying information. Accordingly, the scope of protection of this invention is limited only by the following claims and their equivalents.

We claim:

1. An article comprising:
   a computer-readable storage medium including computer program instructions configured to track memory, comprising:
   instructions to maintain size and type information of memory allocation in a fixed location;
   instructions to select a first fixed location for a small memory allocation and a second fixed location for a large memory allocation; and
   instructions to identify one of said fixed locations to a calling application.

2. The article of claim 1, wherein said instructions to selecting first and second fixed locations includes differentiating between a small and a large memory allocation in said fixed location.

3. The article of claim 1, wherein said instructions to maintain size and type of memory allocation is a memory manager.

4. The article of claim 1, wherein said first fixed location is a header of a small memory allocation.

5. The article of claim 1, wherein said second fixed location is a hash table for a large memory allocation.

6. The article of claim 5, further comprising instructions to identify a location of said memory size allocation in said hash table.

7. The article of claim 6, wherein said instructions to identify said fixed location for return to a calling application includes satisfying Windows alignment semantics for allocated memory.

8. The article of claim 1, further comprising instructions to maintain a count of memory used by said calling application.

9. The article of claim 8, wherein said instructions to maintain said count is selected from the group consisting of: a paged memory counter and a non-paged memory counter.

10. An article comprising:
    a computer-readable storage medium including computer program instructions configured to track memory, comprising:
    instructions to maintain size and type information of memory allocation in a fixed location;
    instructions to select a first location for a small memory allocation and a second location for a large memory allocation; and
    instructions to identify one of said locations to a calling application.

11. The article of claim 10, wherein said instructions to selecting first and second locations includes differentiating between a small and a large memory allocation in said location.

12. The article of claim 10, wherein said fixed location is a hash table for a large memory allocation.

13. The article of claim 12, further comprising instruction to identify a location of said memory size allocation in said hash table.

14. The article of claim 10, further comprising instructions to maintain a count of memory used by said calling application.

15. An article comprising:
    a computer-readable data storage medium;
    means in the medium for maintaining size and type information of memory allocation in a fixed location;
    means in the medium for selecting one location for a small memory allocation and a second location for a large memory allocation; and
    means in the medium for identifying one of said locations to a calling application.

16. The article of claim 15, wherein said means for selecting one of said locations includes differentiating between a size of said memory allocation.

17. The article of claim 15, wherein one of said location includes a hash table.

18. The article of claim 17, further comprising means in the medium for identifying a location of said memory size allocation in said hash table.

19. The article of claim 15, further comprising means in the medium for maintaining a count of memory used by said calling application.

* * * * *